(12) United States Patent
Haines

(10) Patent No.: US 7,114,398 B2
(45) Date of Patent: Oct. 3, 2006

(54) FORCE SENSING SYSTEM

(75) Inventor: Paul Haines, Cambridge (GB)

(73) Assignee: Peach Innovations Limited, Cambridge (GB)

( * ) Notice: Subject to any disclaimer, the term of this patent is extended or adjusted under 35 U.S.C. 154(b) by 0 days.

(21) Appl. No.: 10/937,200

(22) Filed: Sep. 9, 2004

(65) Prior Publication Data
US 2005/0050960 A1 Mar. 10, 2005

(30) Foreign Application Priority Data
Sep. 10, 2003 (GB) .................................. 0321181.0

(51) Int. Cl.
*G01L 5/16* (2006.01)
(52) U.S. Cl. ........................................ 73/779; 440/106
(58) Field of Classification Search .................. 73/779
See application file for complete search history.

(56) References Cited

U.S. PATENT DOCUMENTS
6,679,127 B1 * 1/2004 McKenna .............. 73/862.637

FOREIGN PATENT DOCUMENTS
RU SU 1650171 A1 5/1991

* cited by examiner

Primary Examiner—David M. Gray
Assistant Examiner—Lori Moorman
(74) Attorney, Agent, or Firm—Synnestvedt Lechner & Woodbridge, LLP

(57) ABSTRACT

The present invention seeks to provide a novel load cell which measures the force applied to, for example, an oarlock, without alteration to the boat and with minimal requirements for installation, use and maintenance. The force sensing system comprises (i) a force sensor, (ii) a load member to which a load is applied and (iii) a support member contacting a support, the force sensor deflecting when transmitting a force between the load member and the support member; wherein the load member and support member are concentric tubes and form, with the force sensor, a unitary assembly.

15 Claims, 3 Drawing Sheets

FORCE SENSING SYSTEM

CROSS REFERENCE TO RELATED APPLICATIONS

The present application is related to, and claims priority from, GB Patent Application No. 0321181.0 filed on Sep. 10, 2003. The entire contents of the application is hereby incorporated by reference in its entirety.

BACKGROUND OF THE INVENTION

1. Field of the Invention

This invention relates to a force sensing system. It may be used as a device to measure rowing performance; it enables the force transmitted by a rower through an oar to an oarlock to be measured. The oarlock is the rotating support for the oar.

2. Description of the Prior Art

In the sport of competitive rowing, the analysis of a rower's technique and its contribution to boat speed is greatly enhanced by the measurement of physical parameters such as the forces acting on the oars and hull. One such measurement is the force applied by an oar to its oarlock. FIG. 1 shows a plan view of a typical section of rowing boat, including recognisable features such as the sliding seat (1), footplate (2), and an oar (3). The oarlock (4) is a support for the oar that rotates about a fixed near-vertical pin (5) situated on an outrigger (6). Whilst the interaction of forces and inertia on a rowing boat are complex, the force between oar and oarlock provides a straight-forward representation of the forces on the oar, and moreover offers a convenient location to insert some instrumentation.

A number of instrumented oarlocks have been previously devised. An example made by K. Philter of East Germany in the 1950s transcribed the deflection of a sprung component in the oarlock to a paper record.

An electro-mechanical system used by the University of Pennsylvania in the 1960s consisted of an oarlock mounted on a sliding spring loaded mechanism. The displacement of the oarlock during the stroke was proportional to the applied force, and this was converted by means of switches into an electrical signal for display to the coxswain. Practical disadvantages reportedly included the difficulty of moving the system from one boat to another, and the vulnerability of the mechanism to damage.

More recently, strain gauges have been used to measure the loads on the oarlock or pin, with the resultant signals captured by electronic data acquisition systems for display on the boat or relayed to the coach.

An example of this was developed by V. Kleshnev of Russia in the 1990s (see SU 1650171), and consists of a standard oarlock modified to include a load cell. The whole mechanism rotates about a standard pin, and provides a force measurement perpendicular to the oar. To resolve the force into a direction parallel to the hull (i.e. the effective propulsive force) it is necessary to measure the angle of the oarlock relative to the hull. The device enables such a measurement, using a gear mechanism and potentiometer. However, the device is disadvantaged by its size, which would preclude its use on most modern rigs without modification. The rotation of the load cell also presents a problem, as the flexible cable required to transmit the signals to the hull would provide a mechanical weak-spot.

Another approach has the oarlock rotating on a second pin which is parallel and located sternwards of the boat's standard pin. The two pins are connected using a load cell through which all forces are transmitted. Whilst this results in a force measurement parallel to the hull, the method inherently changes the geometry of the boat, so cannot be considered to be provide 'non-invasive' testing.

Other systems measure the force transmitted through the oats, typically by modifying them to incorporate a strain sensing element. This technique is quite common, as the modifications are relatively easy to carry out. However, regular recalibration is usually required, as the readings will be proportional to the elasticity of the oar which, given the materials commonly used in oar manufacture, typically varies widely with temperature and age. Other drawbacks include the vulnerability of the cabling required to take the signals off the oar, and the requirement to supplement the force measurement with the angle of the oar in order to resolve the effective propulsive force.

An assessment of the rower's technique can also be derived from a measurement of the reactive force between the athlete's feet and the hull. This measurement effectively superimposes the forces due to the inertial effects of the athlete's body movement and the forces applied to the oar handle. Whilst providing a fairly complete picture of the effect of the rower on the hull, the inability to separate out the force on the oar means that it is an incomplete solution for analysing rowing technique. There are also obstacles to achieving any degree of accuracy: the direction and point of application of force has wide variability; the athlete's feet may tend to contact with the sides of the hull in a narrow boat, thereby channelling some of the applied force away from the sensing element.

The measurement of oar or oarlock angle is also an important feature of measuring rowing performance since (in addition to allowing a force to be resolved in a direction parallel to the hull, as in Kleshnev SU 1650171), it allows one to measure force as a function of oar angle, plus the total arc of the rowing stroke. Angle measurement is typically implemented by means of a potentiometer whose body is fixed relative to the hull and whose rotor is mechanically linked to the oar or oarlock by gearing, lever arms or a tensioning band. Such methods (e.g. as implemented by Kleshnev—see above) usually requires several steps for installation and expensive sensors to achieve the required ruggedness.

Despite the valuable data they yield, prior art systems have yet to achieve wide-spread usage and are confined mainly to the higher echelons of the sport. This reflects the shortcomings of the prior art, which tend to be deficient in at least one aspect of reliability, ease of installation, ease of use, accuracy of measurement and affordability.

All prior art systems require modification of the rig of the boat, some have compromised accuracy, and most are inherently fragile or vulnerable. These shortcomings help to explain why such sensors have failed to achieve any widespread use, despite the obvious advantages of the data they can provide.

SUMMARY OF THE INVENTION

In a first aspect of the present invention, a force sensing system comprising (i) a force sensor, (ii) a load member to which a load is applied and (iii) a support member contacting a support, the force sensor deflecting when transmitting a force between the load member and the support member;

wherein the load member and support member are concentric tubes and form, with the force sensor, a unitary assembly.

The present invention seeks to provide a novel load cell which measures the force applied to, for example, an oarlock, without alteration to the boat and with minimal requirements for installation, use and maintenance. In doing so, the invention provides a novel solution to the more general problem of measuring forces applied to a tube in a confined volume, such as may be found in the measurement of forces applied to the hub of a pulley (the support member then having a bore that fits over a shaft of the pulley).

The invention can be implemented as a device in which the force sensing system is a load cell made up of three concentric tubes, located one inside the other, where the inner tube provides a contact surface for the support (the inner tube is the 'support member') and the outer tube provides a contact surface for the load (the outer tube is the 'load member'), and the middle tube provides a force sensing element that bridges across the two. The load cell is itself therefore a set of strain gauges mounted on a tube. Deformation of the middle tube on which the strain gauges are mounted caused by the load is measured by the strain gauges.

The term 'tube' should be construed as any member with a generally circular cross-section; the cross-section does not however have to be uniform (although it is in the preferred implementation); nor does the tube have to be hollow or have length greater than diameter (although again it does have in the preferred implementation).

The inner tube (i.e. support member) attaches to a support, and may be shaped to provide an appropriate mechanical interface. For example, it may feature a bore that enables the load cell to be mounted onto a shaft, such as the pin (5) on outrigger (6).

The inner tube/support member may incorporate a locking mechanism to secure it to its mounting. For example, the use of grub screws to tighten onto a shaft is used in one implementation.

The outer tube (i.e. load member) provides the contact for the applied force, and may be shaped to provide a suitable mechanical interface. For example, it may present a cylindrical surface about which a load may rotate. A preferred embodiment has a substantially cylindrical outer surface that provides a bearing surface for a rotating oarlock.

The outer tube may incorporate features to retain the applied force. In the example of an outer tube with a cylindrical surface that supports a rotating load, this may be in the form of fixed or removable flanges at both ends to act as end-stops.

The middle tube connects, via a joint, to the inner tube at one end, and via another joint to the outer tube at the other end. The section between the two joints acts as the force sensing element. As the only mechanical linkage between the inner and outer tubes, all force applied to the outer tube passes through the force sensing element to the support. The force sensing element should be shaped to promote sensitivity to forces that are applied in the desired directions, whilst reducing sensitivity to forces in other directions. For example, a simple cylindrical section of constant radius provides good sensitivity to radially applied forces.

This description has referred to the inner and outer tubes providing the interface to the support and load respectively, but there is no reason for the roles not to be reversed. Similarly, the examples given include a load that rotates about the load cell. Again, there is no reason for the load cell not to be fixed to the load, with the whole rotating about a shaft. The device may also incorporate a multipole magnetic ring which may be used as an index for rotational measurement.

The present invention can therefore be implemented as a composite sensor in a single unit that measures forces and oat position as transmitted through an oarlock. The primary things the device can measure are the forces applied by each rower and the position of the oars.

A modified oarlock forms an assembly with the sensor, together providing a drop-in replacement for a standard oarlock. To transfer between boats, the assembly can be removed by loosening the retaining mechanism (normally two grub screws) and lifting off the pin. To replace the oarlock when worn (typically once a year), it can be easily released from the assembly, e.g. by removal of a circlip. Signal conditioning and conversion electronics can conveniently be contained within an enclosure integral to the sensor, thereby enabling a robust electrical interface between the sensor and the controlling instrumentation.

The design is used both for sweep oar rowing (where each rower has one oar), and sculling (where each rower has two oars). The difference is merely a mechanical scaling factor, with the sweep oar sensor being c. 20% larger than the sculling sensor.

These and other features of the invention will be more fully understood by reference to the following drawings.

BRIEF DESCRIPTION OF THE DRAWINGS

The invention will be described with reference to the accompanying drawings, in which.

DETAILED DESCRIPTION

Figure 1:
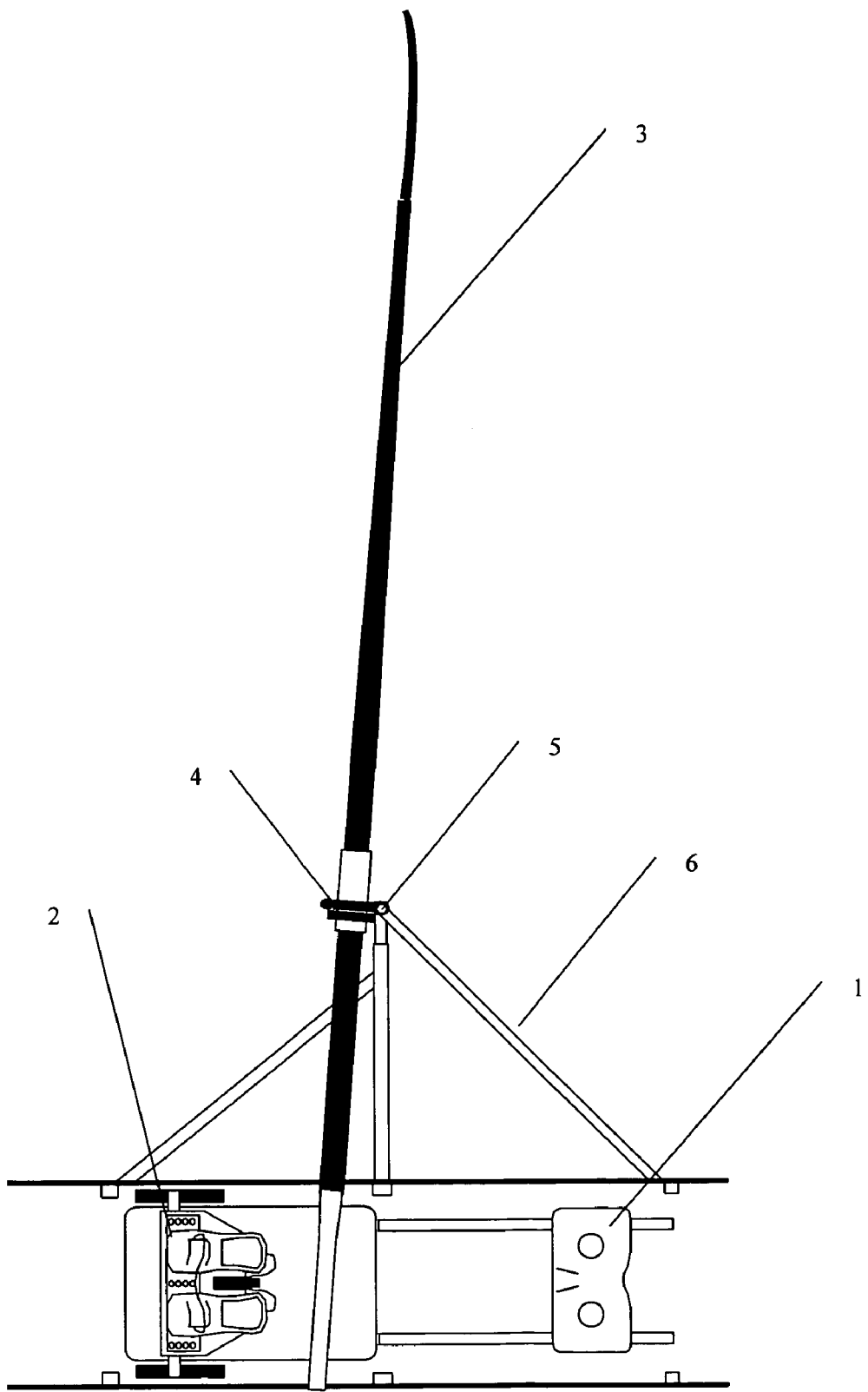
FIG. 1 is a plan view of a part of a rowing boat, showing conventional elements including an oar, oarlock and outrigger.

During the course of this description, like numbers will be used to identify like elements according to the different views that illustrate the invention.

An implementation of the present invention seeks to provide a novel sensor which measures both the force applied to the oarlock and the angle of rotation of the oarlock, without alteration to the boat and with minimal requirements for installation, use and maintenance.

The present invention is implemented as a series of concentric cylindrical tubes that can form a suitable force sensing element, and a multipole magnetic ring that can be used as an index for rotational measurement; such a configuration can be fashioned in dimension to be fitted as an unobtrusive sleeve between an oarlock and a pin. More particularly:

it may be secured to an unmodified pin;

the face of the oarlock against which the oar acts is unchanged in its relation to the pin;

the range of vertical adjustment of the oarlock on the pin need not be impaired significantly.

As noted in the Summary section above, the load cell may be of tubular form which measures the forces applied between the outer and inner surfaces.

The inner surface may be shaped to provide a specific mechanical interface. A preferred embodiment has a substantially cylindrical form that may be used to locate onto a circular shaft (or 'pin').

The inner surface may incorporate a locking mechanism to secure it onto its mounting. To lock onto a circular shaft, this may be in the form of a collet which is compressed into a tapered recess between the shaft and the inner surface, for example by means of a nut threaded onto the sensor. However, a preferred embodiment has one or more threaded holes into which grub screws can be tightened radially through the inner surface onto the shaft.

The outer surface may also be shaped to provide a specific mechanical interface. This could consist of hooks, threaded holes or other devices to which force can be applied. A preferred embodiment has a substantially cylindrical outer surface that provides a bearing surface for a rotating oarlock.

In this embodiment, the outer surface may have features to locate the oarlock that also facilitate its easy replacement when worn with use. For example, a flange at one end can act as a fixed end-stop, whilst an external circlip fitted in a groove at the other end acts as a removable endstop. With the circlip removed, the oarlock can slide off the outer surface and be replaced.

The inner and outer surfaces are connected via a sensing element that deflects when force is applied between the two. This is the basis of the force measurement and should be shaped to promote sensitivity to forces that are applied in the desired directions, whilst reducing the sensitivity to forces in other directions. For example, four parallel struts can be used to provide good sensitivity to radially applied forces. In a preferred embodiment, a cylindrical tube is used, again to provide good sensitivity to radially applied forces, but in a substantially reduced diameter.

The strain gauges used in this embodiment are configured to measure forces in a single radial direction—i.e. longitudinal to the boat—although they may be supplemented with a second set of strain gauges to measure the orthogonal force—i.e. inwards towards the boat. They may be further supplement by strain gauges to measure vertical force and rotation moments, but the shape of the sensing element will not enable particularly sensitive readings.

To resolve the forces correctly, the mechanical alignment of the sensor needs to be known. It may therefore incorporate features to enable angular alignment on a shaft. Where it is possible to fashion the shaft, this may be in the form of a keyway on the shaft and a notch on the inner surface of the sensor, or vice versa. Where the shaft is featureless, the sensor may have an external marking or shape to aid alignment either visually or using a tool. In this case, the preferred embodiment is shaped to engage a tool in the form of a mating clevis.

The clevis can be mounted on a lever arm so that the alignment can be controlled at some distance from the shaft with a resultant increase in accuracy.

Part or the whole of the outer surface may rotate relative to the inner surface, with a sensing element providing a measurement of the angle of rotation.

The sensing element could take several forms: a potentiometer and gearwheel, optical encoder, a cam and mechanical follower, a cam and proximity detection. All these are established techniques. However, the sensor's environment may restrict the use of moving components, gears, or optical components, and the space constraints may preclude the use of elaborate protective devices. A preferred embodiment therefore uses a magnet sensing method.

In this embodiment, a multipole ring magnet presents a magnetic field of alternating north and south poles. Field strength is measured axially to the ring magnet at two points separated by half a pole, resulting in approximate sine and cosine signals as the ring rotates. This can be used to estimate the angle of rotation modulo two poles—i.e. a ring magnet with 2n poles will yield the same angle estimate n times through a full 360° rotation. A secondary sensing element may therefore be required in order to determine the absolute position of the ring:—for example, a switch that is tripped once per revolution. However, in a preferred embodiment, an oarlock is known to rotate repetitively through a restricted range of movement, enabling a ring magnet with eight poles to be sufficient for a correct estimate of oarlock position without a secondary sensing element.

A preferred embodiment of the invention takes the form of a sensor that measures the force applied to an oarlock longitudinally in a boat, and the angle of the oarlock relative to the hull. It provides a simple drop-in replacement for a standard oarlock—i.e. the rotating support for the oar.

A particular embodiment of the invention is a load cell that fits as an unobtrusive sleeve between a rotating oarlock and the vertical pin at the end of an outrigger. It measures the radial force applied by the oarlock to the pin in a direction parallel to the hull of the boat.

Figure 2:
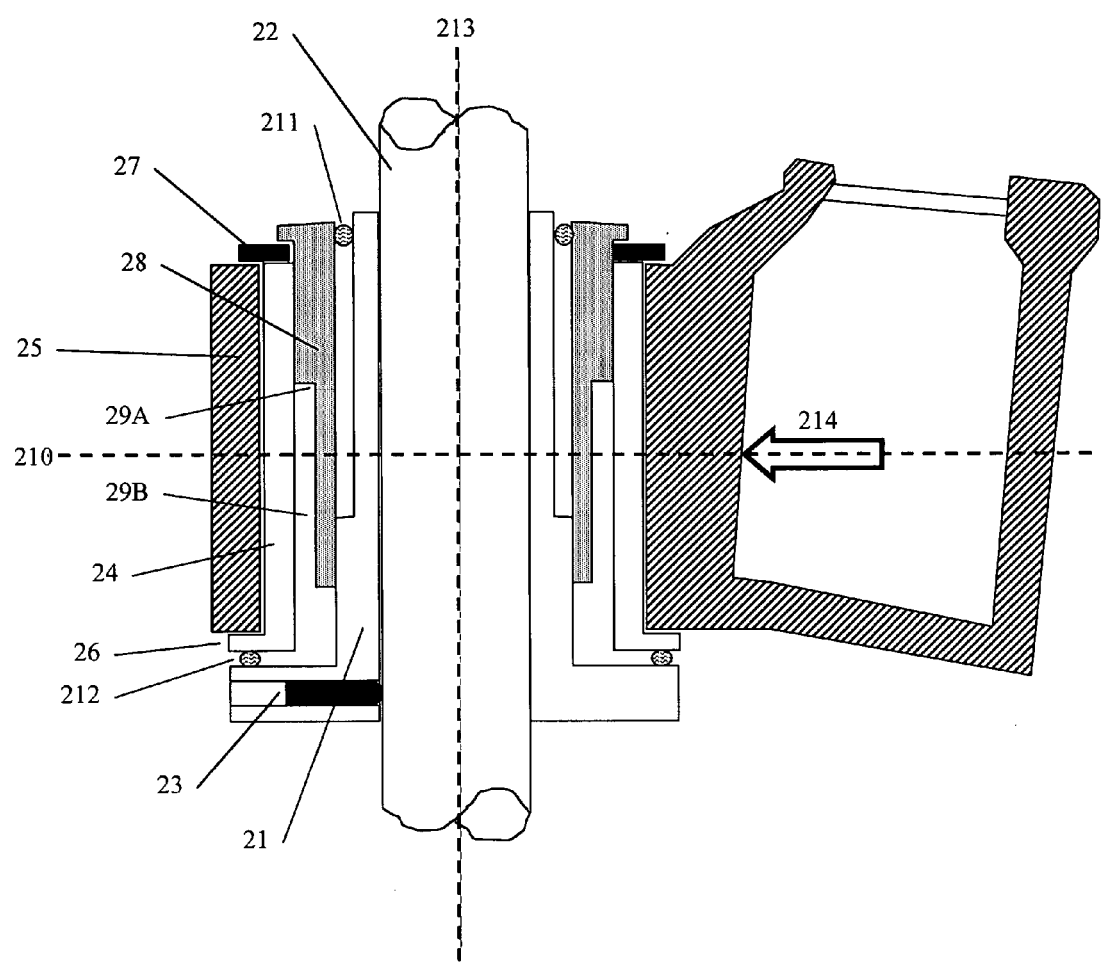
FIG. 2 is a sectional view of a force sensing system in accordance with the present system. The system is a sleeve that fits between an oarlock and the pin of an outrigger.

The invention can provide in this guise a fully sealed load cell of 2000N capacity in a tubular form of length 80 mm, inner diameter 13 mm and external diameter 21 mm. This embodiment has proven to meet the typical requirements a rowing coach and athlete:

easy installation and no boat modification required low cost of manufacture highly robust The load cell consists principally of three concentric stainless steel tubes of circular cross-section, fitted together one inside the other. This is shown in cross section in FIG. 2. With the exception of various features, it is rotationally symmetric about a longitudinal axis (213).

The inner tube (21) has an internal bore that locates onto the pin (22). The bore is closely matched to the pin diameter in order to minimise mechanical play. The inner tube also features two threaded holes for grub screws (23) that, when tightened, prevent its free rotation or axial movement on the pin.

The outer tube (24) provides the mounting for the oarlock (25). Its outer surface is a cylindrical bearing surface on which the oarlock can rotate. The oarlock has a corresponding bore of slightly larger diameter. It is possible to use a standard oarlock, modified appropriately. An external flange at one end of the outer tube (26) provides an end-stop for the oarlock, whilst an external circlip is used as an end-stop at the other (27). Removal of the circlip enables the oarlock to be taken off and replaced.

The middle tube (28) joins at one end to the inner tube and at the other to the outer tube. The joints are made by means of close fitting sections which, when pressed together, provide a permanent fit. The section between these two joints is a uniform cylinder and acts as the force sensing element (29A, 29B). The tubes are arranged so that the point of application of the force applied by the oar onto the oarlock (214) is approximately at the centre of the force sensing element (210).

Soft silicone gaskets (211 and 212) are installed at top and bottom to seal the remaining gaps between the inner and outer tubes without compromising the transfer of force through the tube.

Figure 3:
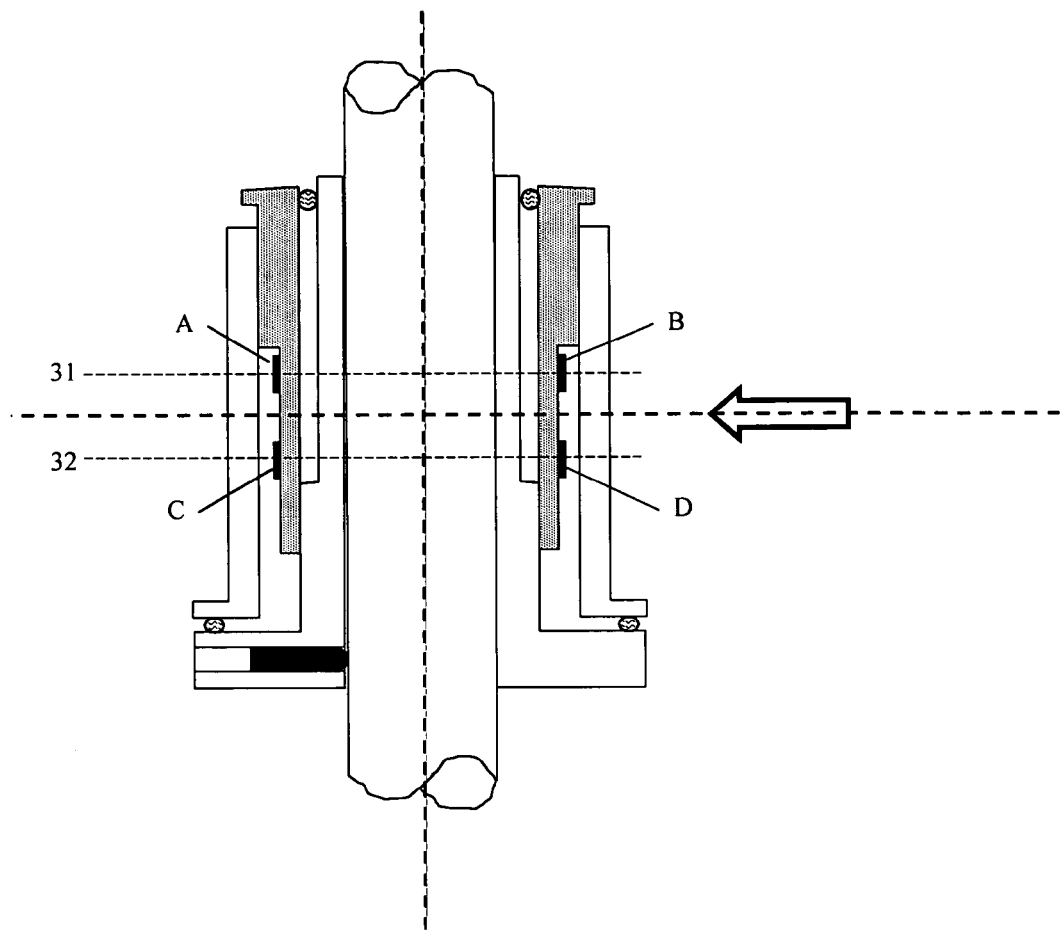
FIG. 3 shows a sectional view of the force sensing system, depicting the location of the strain gauges.
Figure 4:
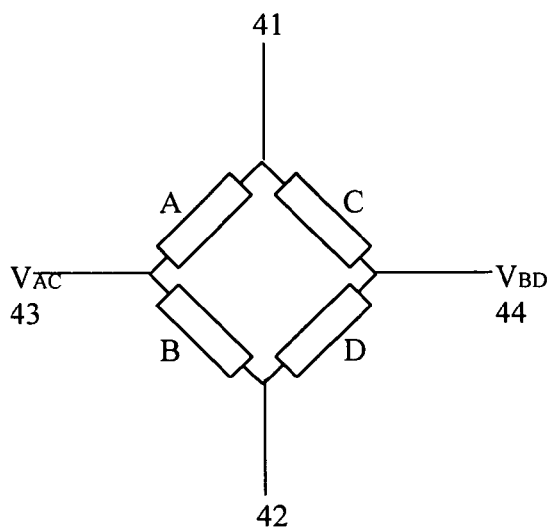
FIG. 4 is a schematic of the Wheatstone bridge circuit used to measure the voltages across the strain gauges.

Four strain gauges A–D are installed on the force sensing element as shown in FIG. 3, and are connected electrically to form a Wheatstone bridge as in FIG. 4. With an excitation voltage applied the bridge (41 and 42), the differential voltage across the two outputs (43 and 44) is proportional to the radial force applied in the plane of the strain gauges. Note that the sensitivity of the output is proportional to the distance between the centrelines of gauges A&B (31) and the centreline of gauges C&D (32). The gauges are therefore placed to maximise this distance whilst maintaining an appropriate margin to the edge of the force sensing element.

The electrical connections from the strain gauges are brought off via the inner tube. For convenience, an integral electronics enclosure can be fitted to the load cell which contains the signal conditioning and conversion for the measurements.

The strain gauge configuration is theoretically insensitive to forces applied in other directions. For example, a longitudinal component of force should result in equal compression of the four gauges, and therefore have no net effect on the output of the Wheatstone bridge. However, various factors may reduce this insensitivity, for example: interactions between modes of deflection; inaccuracy of gauge placement; mis-match of gauge characteristics; non-linearities in mechanical strain due to edge effects, residual stress, machining irregularities and so on.

In particular, it has been found that the load cell output can be sensitive to the moment of the applied force—i.e. to the location of the point of application. In this instance, it was found that the voltage outputs from the two half bridges (43 and 44) could be used separately to estimate the location of the point of application and to provide a correction in calibration. It was found that by measuring the bending moment at two different heights using half bridges, a suitable calibration could give the accuracy required:

$(V_{AC}-V_{BD})$ gives a first estimate of the applied force $V_{BD}$ measured separately gives an estimation of the bending moment $M_2$ of the applied force, and is used in the calibration to refine the estimate of the applied force A further refinement, not detailed here, uses the angle measurement to estimate the cross-axis terms and to improve the accuracy.

Careful choice of dimensions, detailing and materials, in keeping with standard load cell design, has largely eliminated other effects to the extent of the accuracy demanded by the application. However, should a greater accuracy be required, further strain gauges or other sensing devices may be employed to provide corrections in calibration.

Furthermore, the sensor may be instrumented to provide additional measurements. For example, a second set of strain gauges could be placed at 90° to the first set, so as to provide an orthogonal radial force measurement.

The oarlock angle is measured using two Hall effect sensors and a multipole ring magnet. The magnets are contained in the rotating ring that locates on the oarlock, and the sensors are contained in the electronics tray. This ensures a highly robust non-contact solution.

The ring magnet has 8 axial poles equally spaced, alternating North/South. The magnetic field strength is found to vary approximately sinusoidally around the circumference within a certain distance from the magnet. The sensors are spaced 22.5° apart, thus spanning half a pole. This means that as the magnet rotates, one sensor will read a sine wave, whilst the other reads a cosine. The combination of the two is used to estimate the angle. Although the repetition of pole pattern every 90° means that the reading is relative, the restricted regime of use (c. 110°) means that an algorithm can figure out where it is in absolute terms.

A problem arises in that we require some vertical play between the magnet (captive with the oarlock) and the sensors. This leads to variations in magnetic field strength seen by the sensors that could confuse a simple position algorithm. This can be overcome by using the sum of the squares of the two field measurements to estimate the distance between the magnet and the sensors. The calibration then uses this information to correct the angle calculation.

The present invention can be an element of a complete instrumentation system for rowing. The principal component is the sensor described above which measures the force and angle applied by the oar onto the pin. It is a drop-in replacement for a standard oarlock and is available in both sweep and sculling sizes. The sensor generates data to enable a precise analysis of timing, force application and oar movement for each rower.

A boat motion sensor derives speed data from an impeller, showing fluctuations in boat speed through each stroke. This is supplemented by a measurement of boar acceleration, giving a highly sensitive indication of hull efficiency, check factor and crew body movement. It is possible to run the system with just the boat motion sensor. Other sensors, such as stretcher force and seat position, may also be included.

An on-board logger provides instant feedback on speed, power and rating. Its stopwatch has programmable time or distance intervals to suit any racing or training program.

Data can be downloaded at the end of an outing to a PC analysis package. An optional radio link enables all data to be viewed by a coach in real-time.

The system also supports the automated synchronisation of video to the data using radio links to a video camera.

Coaches will find the system an invaluable tool for working with the athletes and setting targets. The selection process is aided by identifying well-matched techniques and quantifying power outputs for each crew member.

The PC analysis software offers a wide variety of views for the interpretation of data: The basic graph shows data plotted against time. This shows not only the shape of the force curves, but also timing differences between crew members and the relationship between the forces and the hull motion.

An alternative view shows data plotted against gate angle. A succession of strokes are overplotted, giving the "thumbprint" of a rower's typical force profile. The shape of the curve helps to identify and quantify errors such as discontinuities in the application of power, working the blade into the water, dragging the finish etc.

The system not only generates continuous traces, but also a variety of measurements each stroke, such as average boat speed, rating, arc lengths and power. A plot of these values shows trends through a training piece or race. The data from a single stroke can be viewed as eye-catching bars or across several strokes as a scatter plot, thus showing a rower's consistency.

Lastly, the stopwatch data summarises the performance for each interval, not only for standard measures such as time and distance, but also for any user specified data, such as power and arc lengths.

All views can be configured to the user's precise needs and data can also be exported to other analysis packages.

The system can be configured to support any boat, from 1× to 8+.

easy installation and transfer between boats
pre-calibrated sensors provide reliable and repeatable readings
optional security coding deters theft A typical system on the boat consists of:

a logger for data capture and readout—needs to be removed for download connection to PC.
sensors to measure forces, angles, speed, acceleration
one junction box per rower to provide interconnections
optional fast radio for real-time telemetry connection to coach's PC
optional radio for video synchronisation The system can also be fitted to rowing tanks. By hooking the system up to a PC, the rowers can view force curves and other parameters in real-time.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A force sensing system comprising:
   (i) a force sensor;
   (ii) a load member to which a load is applied;
   (iii) a support member contacting a support, the force sensor deflecting when transmitting a force between the load member and the support member; and
   wherein the load member and support member are concentric tubes fitted one inside the other and form, with the force sensor, a unitary assembly.

2. The force sensing system of claim 1 wherein the load member comprises a bore sized to accept a cylindrical support.

3. The force sensing system of claim 1 in which the force sensor is positioned on a concentric tube.

4. The force sensing system of claim 3 in which the force sensor comprises a first set of strain gauges.

5. The force sensing system of claim 4 in which the strain gauges are arranged to output signals to a Wheatstone bridge.

6. The force sensing system of claim 4 in which the force sensor comprises a further set of strain gauges orthogonal to the first set.

7. The force sensing system of claim 1 further comprising an oarlock and wherein the outer bearing surface of said load member comprises a cylindrical bearing surface rotatably fitted within said oarlock, thereby allowing forces applied to an oarlock to be measured.

8. The force sensing system of claim 7 in which the support member further comprises a bore that fits over an unmodified outrigger.

9. The force sensing system of claim 7 adapted to replace a standard oarlock.

10. The force sensing system of claim 7 in which the force sensor is arranged so that the load is applied to the center of the force sensor.

11. The force sensing system of claim 7 further comprising a calibration of said force sensor, said calibration providing means for compensating for inaccuracies associated with the bending moment of the load.

12. The force sensing system of claim 1 further comprising a plurality of magnets located equally spaced and with alternating polarity around said support member and a plurality of Hall sensors located on said load member such that the angle of the relative rotation of load member and support member is measured.

13. The force sensing system of claim 12 further comprising a calibration of variations in the magnetic field strength due to vertical play between sensors and magnets in the multipole magnetic ring system.

14. The force sensing system of claim 1 further comprising a pulley and wherein the outer bearing surface of said load member comprises a cylindrical bearing surface rotatably fitted within said pulley, thereby allowing forces applies to said pulley to be measured.

15. The force sensing system of claim 14 in which the support member has a bore that fits over a shaft of the pulley.

* * * * *